US005389764A

United States Patent [19]

Nishii et al.

[11] Patent Number: 5,389,764

[45] Date of Patent: Feb. 14, 1995

[54] AUTOMATIC COOKING APPLIANCE EMPLOYING A NEURAL NETWORK FOR COOKING CONTROL

[75] Inventors: Kazunari Nishii, Izumi; Kenji Watanabe, Nara; Shigeki Ueda, Yamatokoriyama; Motohiko Naka, Kawasaki, all of Japan

[73] Assignee: Matsuhista Electric Industrial Co., Ltd., Osaka, Japan

[21] Appl. No.: 937,102

[22] Filed: Aug. 31, 1992

[30] Foreign Application Priority Data

Aug. 30, 1991 [JP] Japan .................................. 3-219868
Aug. 30, 1991 [JP] Japan .................................. 3-219870
Oct. 21, 1991 [JP] Japan .................................. 3-272268

[51] Int. Cl.[6] ................................................ B23K 9/00

[52] U.S. Cl. .................................... 219/506; 219/497; 219/508

[58] Field of Search ............... 219/492, 494, 501, 497, 219/506, 508, 505, 10.55 B; 432/32

[56] References Cited

U.S. PATENT DOCUMENTS 4,625,086 11/1986 Karino ................................ 219/497
4,914,277 4/1990 Guerin et al. .
4,970,359 11/1990 Oh ................................ 219/10.55 B
5,111,028 5/1992 Lee .
5,170,024 12/1992 Hanatani et al. ............. 219/10.55 B

FOREIGN PATENT DOCUMENTS 3-005622 11/1991 Japan .
4-086418 3/1992 Japan .

OTHER PUBLICATIONS

Parallel Distributed Processing, McClelland et al, copywright 1986, MIT Press vol. 2.
Parallel Distributed Processing, McClelland et al copywright 1986, MIT Press, vol. 1.

*Primary Examiner*—Mark H. Paschall
*Attorney, Agent, or Firm*—Wenderoth, Lind & Ponack

[57] ABSTRACT

A cooking appliance controls a cooking device on the basis of temperature information of an object to be cooked that is estimated from changes in physical characteristics. A neural network is taught, for a number of categories of food that are classified according to the temperature of the cooked and completed food, the relationship between changes in the physical characteristic, such as the temperature and humidity, generated during heating of the object to be cooked during cooking, and changes of temperature of the object at the center of the object and the surface of the object in order to provide for an automatic cooking operation.

10 Claims, 13 Drawing Sheets

Fig.5

| cooking category | items | detailed menu |
|---|---|---|
| 1 | sliced fish | mackerel broil with salt<br>salmon broil with salt<br>shrimp figure broil |
| 2 | gratin<br>foil broil | macaroni gratin<br>omelet<br>foil broil |
| 3 | fish broil | saury figure broil<br>saurel figure broil<br>sweetfish figure broil<br>porgy figure broil |
| 4 | broil with soy | yellowtail broil with soy<br>cuttlefish figure broil |
| 5 | half dried | saurel, saury, barracuda<br>opened fish |

Fig.6

| cooking category | finishing surface temperature |
|---|---|
| 1 | 120°C |
| 2 | 100°C |
| 3 | 150°C |
| 4 | 110°C |
| 5 | 100°C |

AUTOMATIC COOKING APPLIANCE EMPLOYING A NEURAL NETWORK FOR COOKING CONTROL

BACKGROUND OF THE INVENTION

The present invention generally relates to a cooking appliance such as an electric-oven, an electronic range, compound ovens, etc. Operation keys in an operating portion of such cooking appliances may be concentrated for improving the use thereof, and cooking performance in an automatic cooking operation may be improved.

The electronic control art has conspicuously penetrated into recent home appliances with the appearance of microcomputers. Cooking appliances are provided with various functions and are especially realized with combined temperature sensors, humidity sensors and microcomputers. One of the functions is an automatic cooking operation.

A cooking appliance for directly detecting the surface temperature of a cooked item with the use of an infrared ray temperature sensor so as to control a heating means, a cooking appliance for inserting a temperature probe into the cooked item so as to directly detect the temperature for controlling the heating means, a cooking appliance for detecting with a thermistor the atmospheric temperature within the cooking chamber so as to effect an automatic cooking operation in accordance with the information relating to the circumstances of the temperature within the cooking chamber, and other cooking appliances have been invented for practical use. In a grill cooking operation or an oven cooking operation with a cooking appliance using an infrared ray temperature sensor, the heat-proof sensor itself becomes a problem as the temperature of the oven interior rises up to 250° C. through 300° C. Actually, the sensor is thermally evacuated, with the temperature of the cooked item being measured to approximately 60° C. Thereafter, the temperature is adapted to be estimated with a temperature grade reaching to 60° C. Therefore, considerable dispersion is caused in the finishing of the cooking operation. In a cooking appliance for detecting the temperature, with a temperature probe being inserted directly into the cooked item, it is positive in terms of the temperature detection, but with problems in that convenience is restricted, and that sanitation is inferior. An automatic cooking method of a cooking appliance using a conventional thermistor, the method most often adopted, will be described hereinafter. FIG. 13(*b*) shows change characteristics in the atmospheric temperature within the cooking chamber from the cooking start. The temperatures are detected with the thermistor. The cooking time of the cooked item is determined with a numerical equation 1. Namely, an elapsed time t1, taken for the atmospheric temperature to reach a certain temperature T, is measured, and a time t, provided through the multiplication of the time t1 by a constant K peculiar to the food, is made a cooking time.

$$t = t1 + K \times t1 \qquad \text{(numerical equation 1).}$$

When, after finishing a cooking operation with the working appliance, cooking has been performed in succession prior to cooling of the cooking appliance, the temperature within the cooking chamber becomes extremely high. FIG. 13(*b*) shows the change characteristics in the atmospheric temperature within the cooking chamber from the start of cooking in this case. The atmospheric temperature is once lowered or is raised. FIG. 13(*b*) is different from FIG. 13(*a*). This is because the heat within the cooking chamber is absorbed into the cooked item for some time if the cooking operation starts when the initial temperature within the cooking chamber is high. In this case, the cooking time cannot be decided with the numerical equation 1. Conventionally the cooking time is decided roughly. A cooking appliance which is superior in cooking performance and operation is hard to realize with this method.

It is said that there is considerable interrelation, depending upon the cooking category, among the finish of cooking, the surface temperature of the cooked item, and so on. An ideal cooking appliance can be realized, even in terms of the finishing of cooking of the cooked item, and also in the concentration of operating keys in cooking categories, if the surface temperature during the cooking operation of the cooked item can be positively recognized with real time without contact. The cooking degree can be recognized by the detection of the surface temperature of the cooked item, and so on. As such a problem as described hereinabove exists, it is difficult to realize such a cooking appliance.

Recently researches into applying a neural network into various fields have been actively engaged. Special cells called neurons exist in a living body. The neurons are combined in large amounts as operation elements in the brains of a living creature. Through neurons a brain has flexible information processing referred to as "learning", "storing", "judging", "association" and so on A model called a neural network is proposed for numerically analyzing the characteristics of signal transmission of the nerve cells. The possibility of various applications are checked.

SUMMARY OF THE INVENTION

Accordingly, the present invention has been developed with a view to substantially eliminating the above discussed drawbacks inherent in the prior art, and has for its essential object the provision of an improved cooking appliance.

Another important object of the present invention is to provide an improved cooking appliance applying the art of the above described neural network to a cooking appliance such as electric oven, electronic range, a compound oven or the like so as to concentrate operation keys in an operating portion for improving the use and the cooking performance in an automatic cooking operation. In order to recognize the degree of cooking, a neural network is used as a means for indirectly estimating the information of a physical amount characteristic of the cooked item within the cooking chamber, actually the surface temperature and the center temperature of the cooked item, which are difficult to detect in practice. That is why the temperature relationship between the input information and the cooked item is ambiguous, and the conventional method is judged to be difficult to realize, as the setting of the function form and the difficult adjustment of the parameters are considered predictable when a non-linear recursion analyzing method is used. One of the characteristics of the neural network, "Approximate Realization of Continuous Mapping Function", is used. The surface temperature and the center temperature of the cooked item during the cooking operation are actually estimated from physical information that is measured or detected. The information capable of being sensed with the cooking appliance is temperature information around the cooked item, humidity information, commercial power supply voltage information, elapsed time information from the cooking start, and so on. The present invention realizes a cooking appliance where the neural network for estimating in real time the surface temperature and the center temperature of the cooked item during the cooking operation is built and the neural network is transferred to the microcomputers of the cooking appliance so as to concentrate the operating keys in the operation portion and to improve the cooking performance in the automatic cooking operation.

BRIEF DESCRIPTION OF THE DRAWINGS

These and other objects and features of the present invention will become apparent from the following description taken in conjunction with preferred embodiments thereof with reference to the accompanying drawings, in which:

FIG. 5 is a detailed view of a cooking category of the cooking appliance;

FIG. 6 is a view showing the finishing surface temperature for each of the cooking categories of the same cooking appliance;

DETAILED DESCRIPTION OF THE INVENTION

Figure 1:
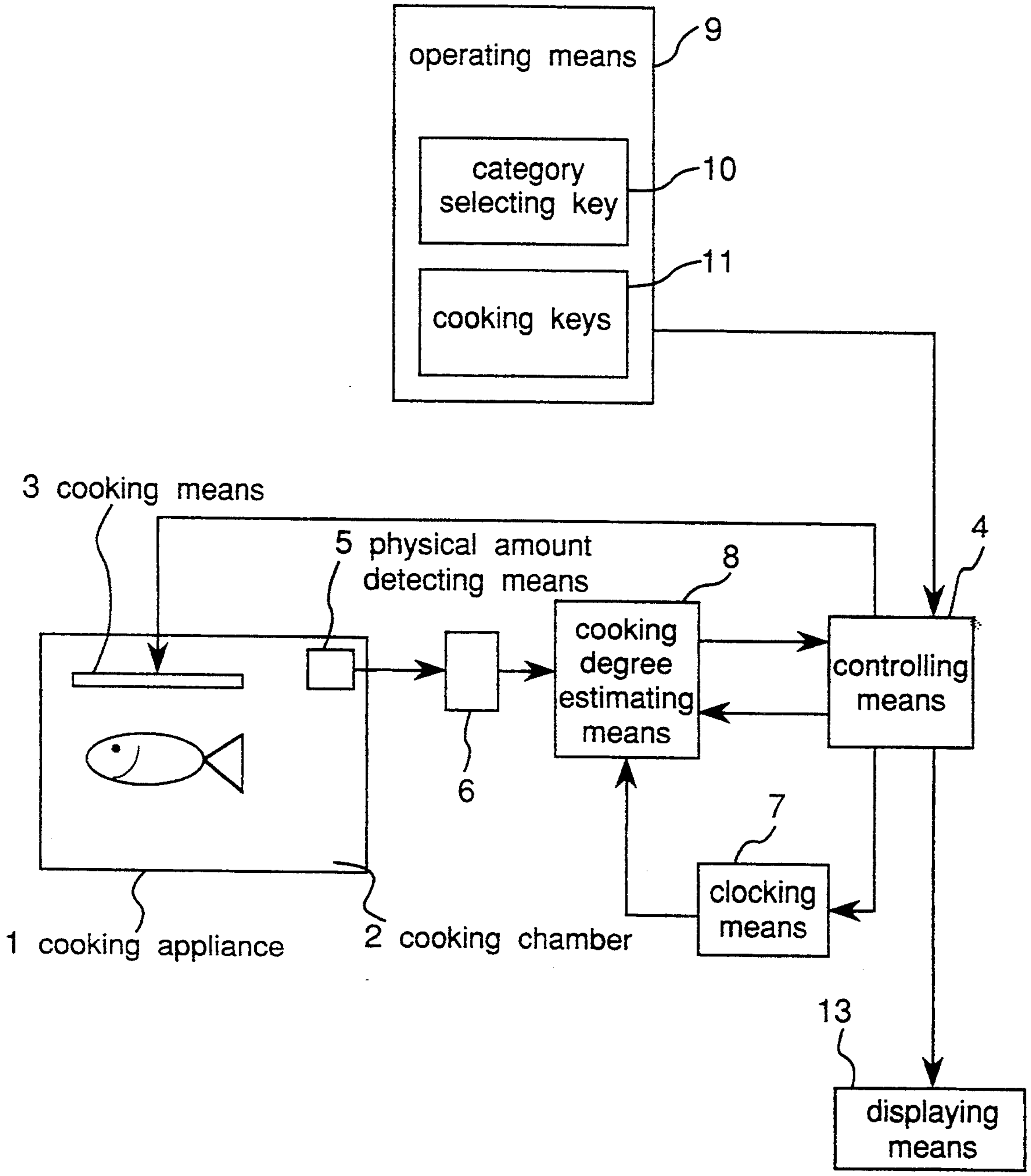
FIG. 1 is a block diagram of a cooking appliance in one embodiment of the present invention.

Before the description of the present invention proceeds, it is to be noted that like parts are designated by like reference numerals throughout the accompanying drawings.

The present invention will be described hereinafter with reference to FIG. 1 through FIG. 12 in accordance with the following embodiments.

(EMBODIMENT 1)

Figure 4:
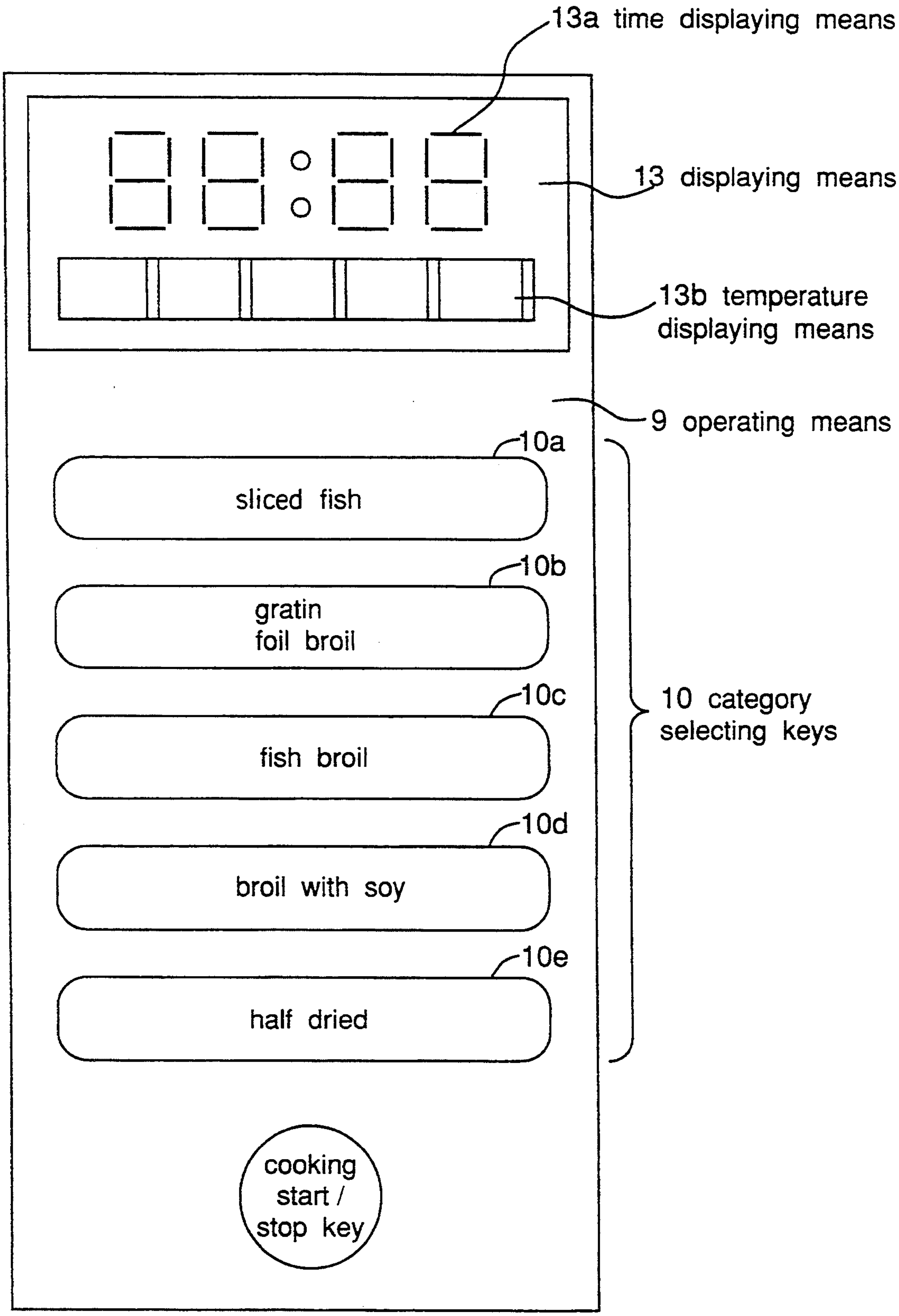
FIG. 4 is a block diagram of an operating portion using a cooking appliance in accordance with the block diagrams of FIG. 1 through FIG. 3.

An embodiment where a grill portion of an oven range has been applied as a cooking appliance will be described hereinafter. A block diagram thereof will be described in FIG. 1. The cooking appliance 1 is composed of a cooking chamber 2 for accommodating an item to be cooked, a cooking means 3 (a heater in the present embodiment) for cooking things to be cooked, a controlling means 4 for controlling the cooking means 3, a physical characteristic amount detecting means 5 for detecting changes in a physical characteristic amount derived from the cooked item during the cooking operation, and A/D converting means 6, a clocking means 7, a cooking degree estimating means 8 for estimating the cooking degree of the cooked item, and an operating means 9. The physical amount detecting means 5 is adapted to detect the atmospheric temperature within the cooking chamber 2 in the present embodiment. The physical amount detecting means 5 is composed of a thermistor. The cooking degree estimating means 8 is a temperature estimating means for estimating the temperature of the cooked item in the present embodiment. The clocking means 7 counts the time from the start of cooking. The operating means 9 is composed of a category selecting key 10 for selecting the category of the food and a cooking key 11 for effecting cooking start and stop. FIG. 4 shows the construction of the operating means 9. A category selecting key 10 can select five types of categories. Reference numeral 10*a* shows a key for a slice of fish or meat broiling with a net, reference numeral 10*b* shows a key for a gratin or for foil grilling, reference numeral 10*c* shows a key for fish or meat broiling with soy, reference numeral 10*d* shows a key for fish broiling with soy into a good appearance and for meat with bones in it, and reference numeral 10e shows a key for half-dried food. The detailed menus included in the respective categories are shown in FIG. 5. The cooking degree estimating means 8 in FIG. 1 is adapted to estimate the surface temperature and the center temperature of the cooked item in accordance with the outputs of the physical amount detecting means 5, the clocking means 7, and the category selecting key 10. The controlling means 5 is adapted to control the cooking means 3 in accordance with the output of the cooking degree estimating means 8. The cooking means 3 is a heater which is disposed in a cooking chamber 2. The A/D converting means 6 converts the output of the physical amount detecting means 5 into digital form.

It has been confirmed by a cooking experiment that there are considerable interrelations between the surface cooking temperature of the cooked item and the finish of cooking of the food. FIG. 6 shows the surface temperatures at the finish time for each of the confirmed cooking categories. The surface temperatures is measured with a thermoelectric couple engaged with the cooked item. The optimum broiled condition for fish or the like is most suitable at 60° C. through 70° C. and is not at the center temperature decided only by the surface temperature.

It has been confirmed by experiments how the surface temperature and the center temperature of the cooked item, from the cooking start, and the atmospheric temperature within the cooking chamber, are changed as time passes for each of the cooking categories.

Figure 7:
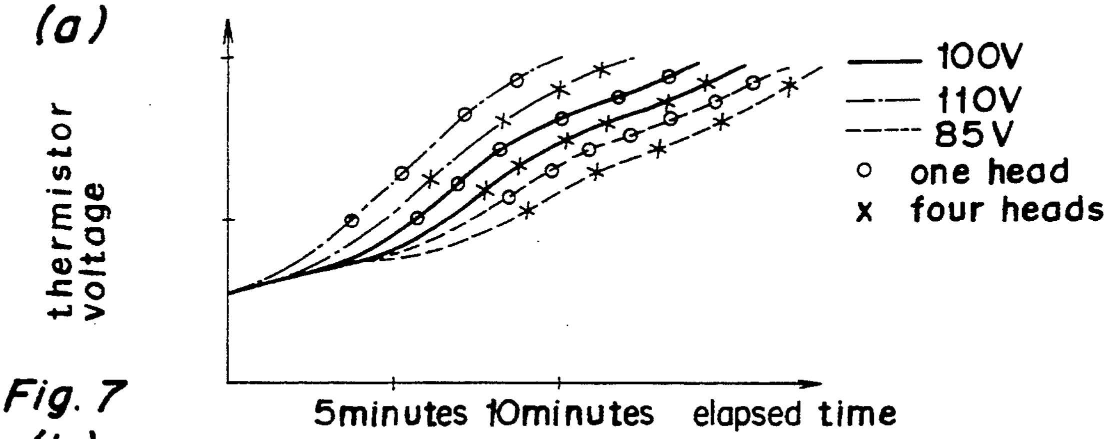
FIGS. 7(*a*) to (*c*) are graphs showing one example of experimental data of the cooking appliance in accordance with the block diagrams of FIG. 1 through FIG. 3.
Figure 7:
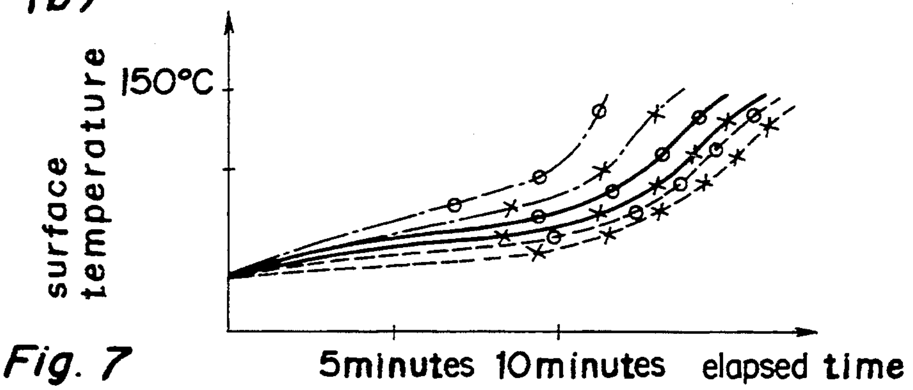
Figure 7:
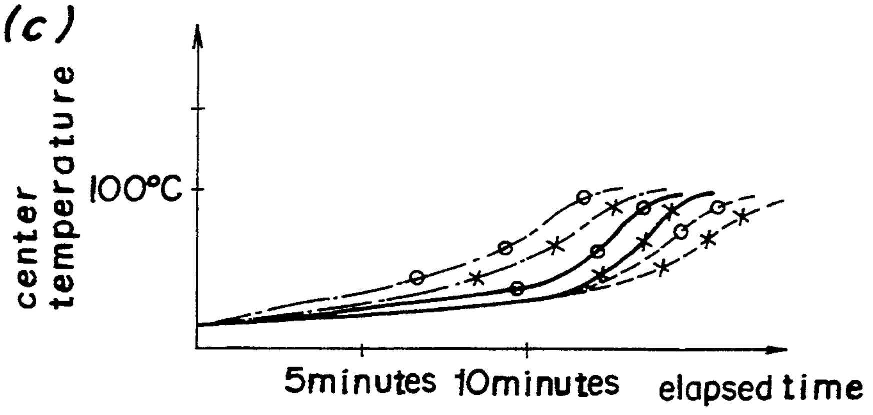

FIG. 7(*a*) shows changes with time in solid lines in the thermistor voltage, detecting the temperature within the cooking chamber from the cooking start, in a case where a mackerel is broiled with salt in a representative menu of a sliced fish, which is in the first cooking category. FIG. 7(*b*) shows with solid lines changes in the surface temperature with time from the cooking start in the same cooking experiment. FIG. 7(*c*) shows with solid lines the change in the center temperature with time from the cooking start in the same cooking experiment. The commercial power supply voltage is 100 V. The thermoelectric couple is engaged so as to effect a measuring operation even in the detection of the center temperature.

Figure 8:
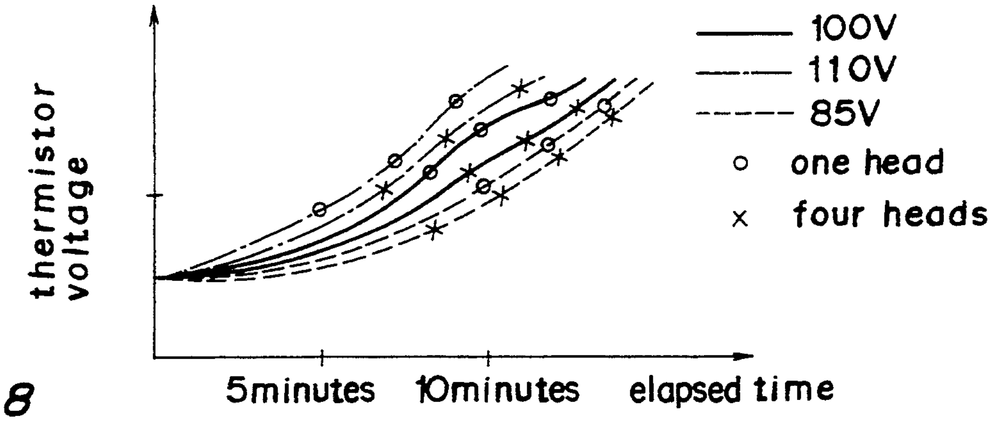
FIGS. 8(*a*) to (*c*) are graphs showing still another example of experimental data of the cooking appliance.
Figure 8:
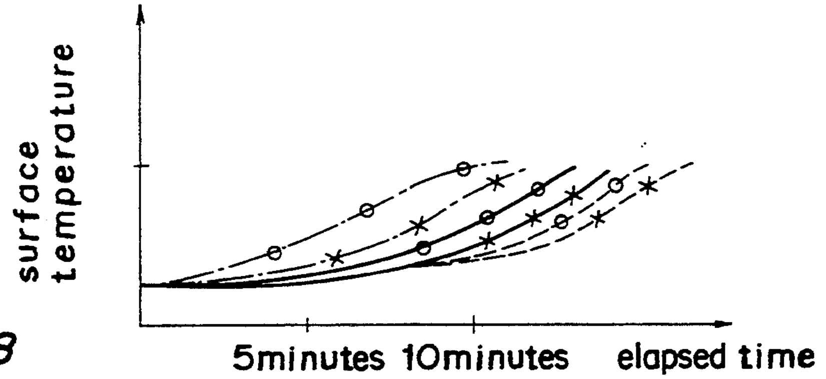
Figure 8:
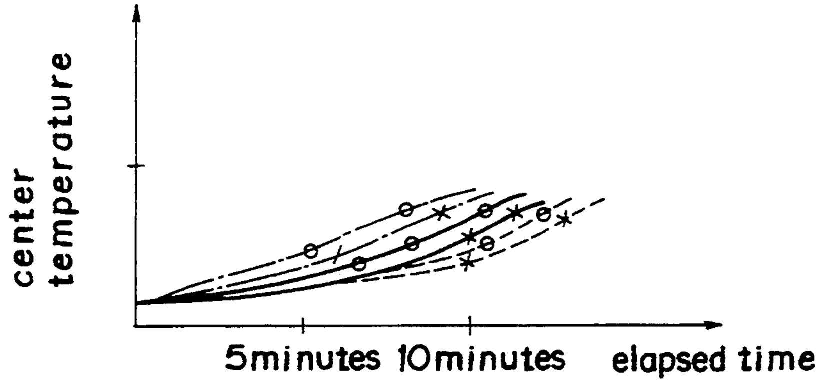

In FIG. 8, like FIG. 7, changes over time in the thermistor voltage, the surface temperature, and the center temperature when macaroni gratin, which is a representative menu of the second cooking category, are experimented with in cooking and are respectively shown with solid lines in FIG. 8(*a*), FIG. 8(*b*) and FIG. 8(*c*).

These experiments are effected with the amount (one fish and four fishes, e.g.) of the cooked item and the initial temperature of the cooked item before the cooking start being changed. As a result, the temperature within the cooking chamber is likely to be raised as the amount of the cooked item becomes less from FIG. 7 and FIG. 8, and the surface temperature and the center temperature of the cooked item rise quickly. The center temperature of the cooked item is saturated before and after 100° C. If, for example, the initial temperature before the start of cooking of the cooked item is different, say at 0° C. and 10° C., the early stage of cooking is different for a moment in the heater cooking. It has been found out that change over time in the thermistor voltage, the change over time in the surface temperature and the change over time of the center temperature are approximately the same. It has also been found out that the difference at the initial temperature of the cooked item does not greatly influence the surface temperature and the center temperature at the cooking completion time. As the temperature within the cooking chamber rises to approximately 200° C. in the oven or grill cooking, it seems that a difference is not caused if the initial temperature of the cooked item is different by ±10° C.

Likewise, similar results are obtained by similar experiments with the third cooking category, the fourth cooking category, and the fifth cooking category, and by cooking experiments with the cooking menu within the same category.

Figure 9:
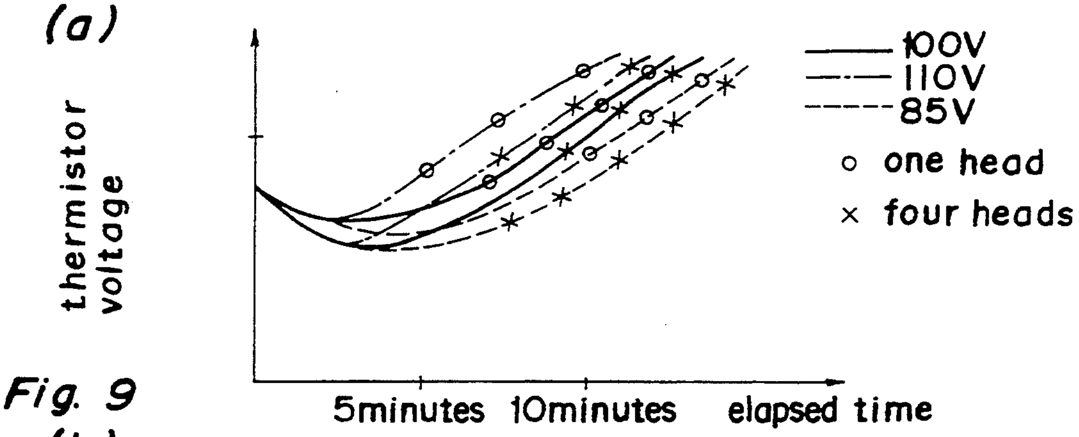
FIGS. 9(*a*) to (*c*) are graphs showing a further example of experimental data of the cooking appliance.
Figure 9:
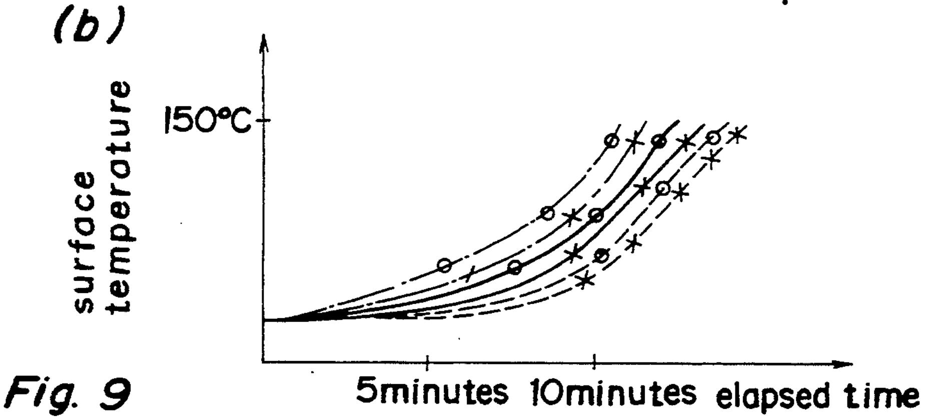
Figure 9:
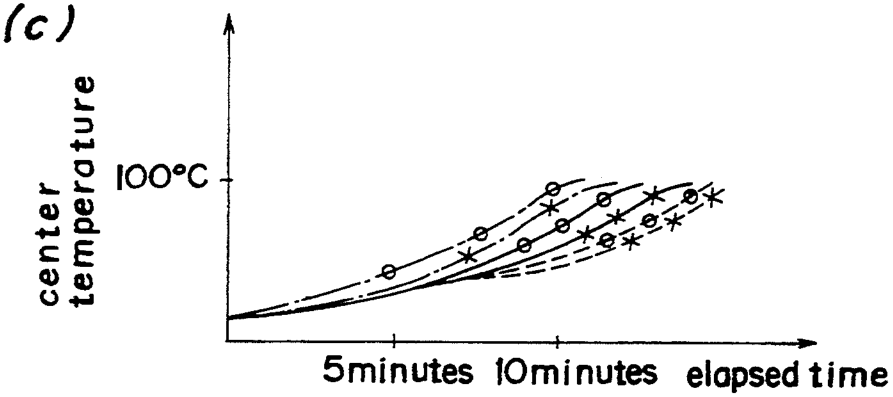

Experiments in a case where, after finishing a cooking operation with the cooking appliance, cooking has been performed in succession prior to cooling of the cooking appliance have also been effected. Here an example of a mackerel to be broiled with salt in the representative menu of the first cooking category is shown. The experiment contents are completely the same as the above described contents except for a point where the temperature within the cooking chamber at the cooking start time is extremely high. FIGS. 9(*a*) to (*c*) show the characteristics thereof. In the change over time in the thermistor voltage in this case, the voltage lowers for some time after the cooking start, and thereafter also rises. This is because the heat within the cooking chamber is absorbed into the cooked item. The change due to the difference in the amount of the food is similar to the result shown in FIG. 7.

The surface temperature Ts of the cooked item can be expressed in a numerical equation 2 with a function F:

$$Ts=F(Vs, \Delta Vs, W, t, C) \quad \text{(numerical equation 2)}$$

wherein Ts is a surface temperature of the cooked item, Vs is a thermistor voltage for detecting the atmospheric temperature within the cooking chamber, ΔVs is the change over time thereof, W is weight of the cooked item, t is an elapsed time from the cooking start, and C is a cooking category.

As the difference in the weight W of the cooked item can be identified from FIG. 7, FIG. 8, and FIG. 9 by the different changes in the thermistor voltage detecting the atmospheric temperature within the cooking chamber, the surface temperature Ts of the cooked item can be expressed by a numerical equation 3:

$$Ts=F(Vs, \Delta Vs, t, C) \quad \text{(numerical equation 3).}$$

The center temperature Tc can also be expressed with a similar function.

Obtain a function F from the above described results, and the surface temperature and the center temperature of the cooked item can be indirectly estimated with the actual time by inputting the atmospheric temperature change information, the elapsed time from cooking start information, and the cooking category as input information.

As it is clear whether or not the food is actually finished at the center temperature through an interrelation between the finish of the cooked item and the surface temperature, a temperature probe is not required to be inserted directly into the cooked item if the surface temperature and the center temperature of the cooked item can be estimated indirectly from the atmospheric temperature information within the cooking chamber. Also, the surface temperature which is impossible to measure can be recognized to a finishing completion as the heat-proof property is limited in an infrared ray temperature sensor, so that an efficient cooking appliance that is easy to use can be realized if the cooking means is controlled in accordance with the temperature information.

Figure 10:
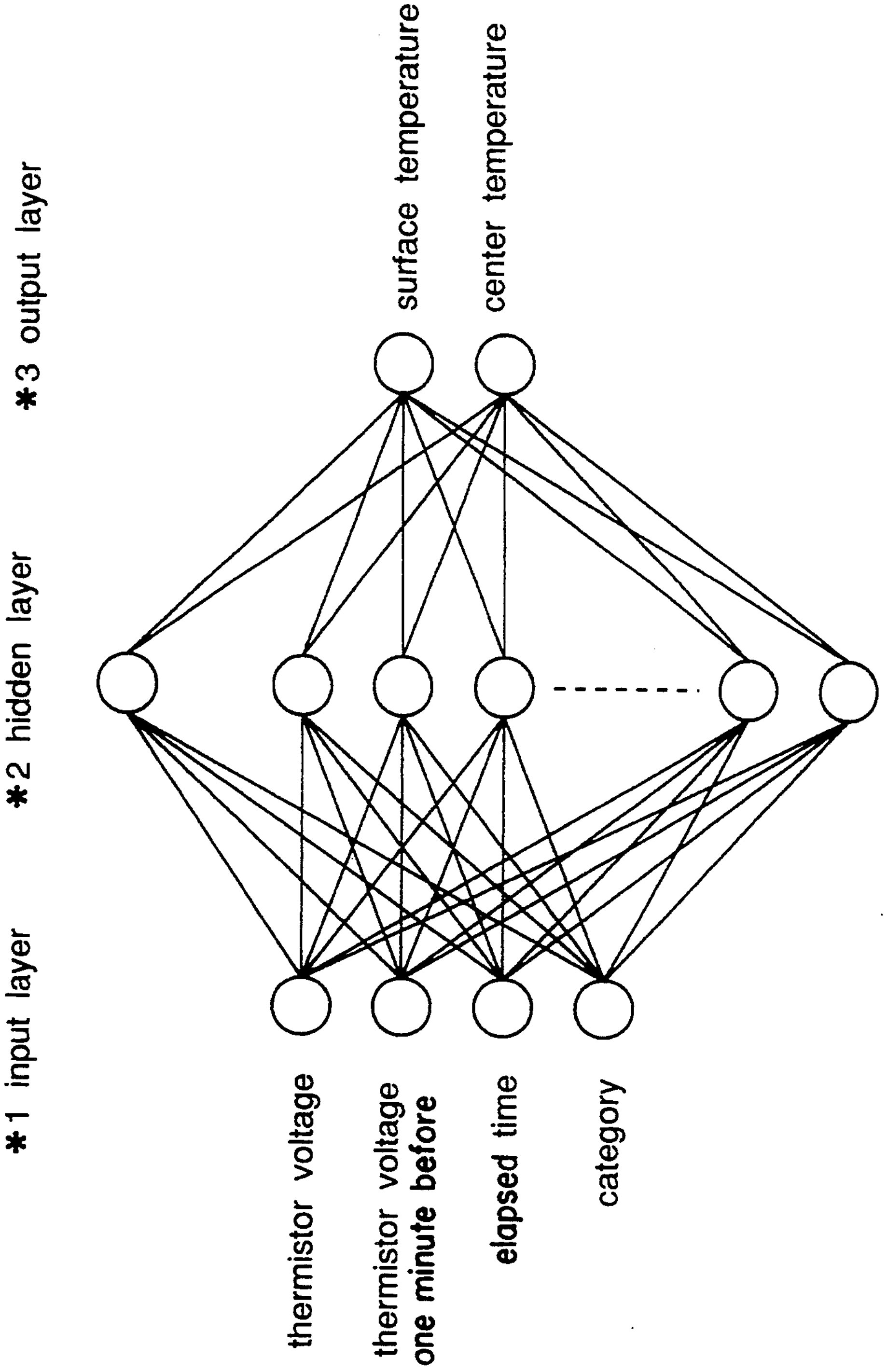
FIG. 10 is a block diagram showing the construction of a multi-layer perceptron using a neural network model using the cooking appliance.

In the present embodiment, a function F is obtained with the use of "The Approximate Realization of Continuous Mapping Function" which is a characteristic of a neural network. There is a document 1 ("Parallel Distributed Processing" written by D. E. Rumelhart, James L. McClelland and he PDP Research Group, Copyright 1986, The Massachusetts Institute of Technology, and the Japanese version "PDP model" translated by Toshikazu Amari and issued by Sangyo-Tosho K.K. in 1989) as a neural network model to be used. In the present embodiment, a multilayer perceptron with a back propagation method is used as the most well-known learning algorithm described in the document 1 and is provided with a cooking degree estimating means 8 as a neural network model. FIG. 10 shows the construction of the neural network model. The perceptron is of three layers, and the neurons of an intermediate layer are ten in number.

Data obtained from cooking experiments as are shown in FIG. 7, FIG. 8 and FIG. 9 are used as learning data. Four information items become parameters of the above described function F, including a thermistor voltage, which is the atmospheric temperature information within the cooking chamber, the time variation portion (a thermistor voltage level one minute before the present time point) thereof, the elapsed time information from the cooking start and the cooking category, and inputted into the neural network model. The output of the neural network model is composed of the surface temperature and the center temperature of the cooked item. The learning operation is effected while the data for each of the six seconds are being sampled. How to learn is omitted in the description as it is known in the document 1. As a result, it is confirmed that the surface temperature and the center temperature of the cooked item can be estimated from the input information with few errors. The surface temperature and the center temperature can be estimated with few errors even if the amount of the cooked item is not learned when the amount of the cooked item is within the learned data range, with a generalizing operation being provided in the neural network model. Namely, the above described function F can be approximated by the neural network model.

In this manner, a plurality of connection strength coefficients of the neural network model, which has finished learning, and the network construction of the neural network model, are given to the cooking degree estimating means 8 so that the temperature estimating means 8 can estimate indirectly in real time the surface temperature and the center temperature of the cooked item in accordance with the input information.

An operation will be described hereinafter with reference to a block diagram shown in FIG. 1. The cooked item is put in a cooking chamber and a cooking category is selected by a category selecting key 10 within the operating means 9. The cooking starts with the cooking key 11. The category information is inputted into the cooking degree estimating means 8 through a controlling means 4. The controlling means 4 outputs a signal for starting the clocking means 7 and also outputs a cooking start signal so as to heat the cooking means 3. The clocking information of the clocking means 7 is inputted into a cooking degree estimating means 8. The physical information (atmospheric temperature information) within the cooking chamber during the cooking operation is inputted into the cooking degree estimating means 8 moment by moment, with the output of the physical amount detecting means 5 being digitally converted by an A/D converting means 6. The cooking degree estimating means 8 periodically estimates the surface temperature and the center temperature of the cooked item moment by moment under the inputted signal and information so as to output the information into the controlling means 4. The controlling means 4 operates so as to control the cooking means 3 in accordance with the estimated temperature information. Namely, the cooking means 3 is controlled until the estimated surface temperature reaches a temperature shown in FIG. 6. If the estimated center temperature does not reach 70° C. at that time, the cooking means 3 is controlled so as to reduce the power of the cooking means 3 for stopping the cooking means 3 if the estimated center temperature reaches a temperature shown in FIG. 6 after the start of cooking, and the estimated center temperature at this time is 70° C. or more, the cooking means 3 at that time point comes to a stop.

According to the present embodiment, as the surface temperature and the center temperature of the cooked item can be estimated positively to cooking completion without contact a thermistor sensor by the use of the neural network model, the cooking performance of the cooked item can be improved, and a plurality of automatic single cooking menus can be concentrated upon a cooking category, thus becoming very convenient in use. A conventional temperature probe is not required to be inserted directly into the cooked item, thus being sanitary. The problem of heat-proof property to be caused in the case of the infrared ray temperature sensor can be removed. When the cooking operation is repeated with a cooking appliance using the conventional thermistor, problems of inferior cooking performance due to the rough decision of the automatic cooking time can be removed.

(EMBODIMENT 2)

Figure 2:
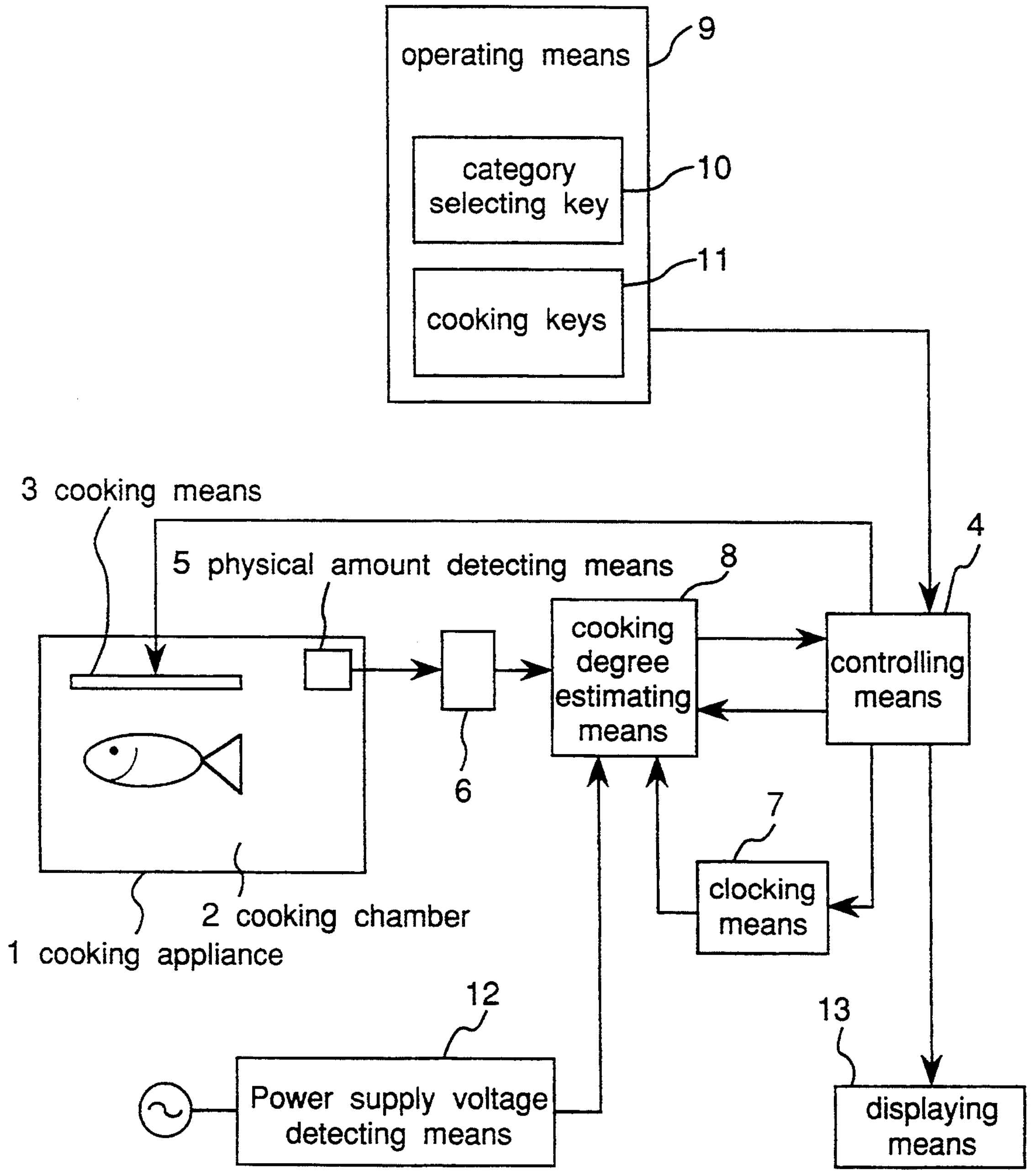
FIG. 2 and FIG. 3 are each a block diagram of a cooking appliance in other embodiments of the present invention.

An object of the present embodiment shown in FIG. 2 is to further improve the accuracy of the temperature estimation of the cooked item as compared with the cooking appliance of the first embodiment with respect to variations in the commercial power voltage. Namely, the second embodiment is different from the first embodiment in that a power supply voltage detecting means 12 for detecting the commercial power supply voltage is provided.

Cooking experiments for this embodiment are effected with a cooking menu of a fifth cooking category from a first cooking category. A mackerel broiled with salt in the first cooking category, as in the first embodiment, and a macaroni gratin in the second cooking category are shown in experimental results in FIG. 7, FIG. 8 and FIG. 9.

These experiments are effected with the commercial power supply voltage (85 v and 110 v) being varied. One point chain lines in FIG. 7, FIG. 8 and FIG. 9 show the results at 110V power supply voltage, and broken lines correspond to 85V. As a result, the atmospheric temperature within the cooking chamber is likely to rise as the power supply voltage is higher from FIG. 7, FIG. 8 and FIG. 9, and it is found out that the surface temperature and the center temperature of the cooked rise quickly.

The parameter of the commercial power supply voltage $V_T$ is inputted into the function of the numerical equation 3 shown in the first embodiment so that the estimating accuracy of the surface temperature Ts of the cooked item can be further improved. The same thing can be said even about the center temperature. The relationship is shown in a numeral equation 4:

$$Ts=F(Vx, \Delta Vs, t, C, V_T) \quad \text{(numeral equation 4)}$$

Figure 11:
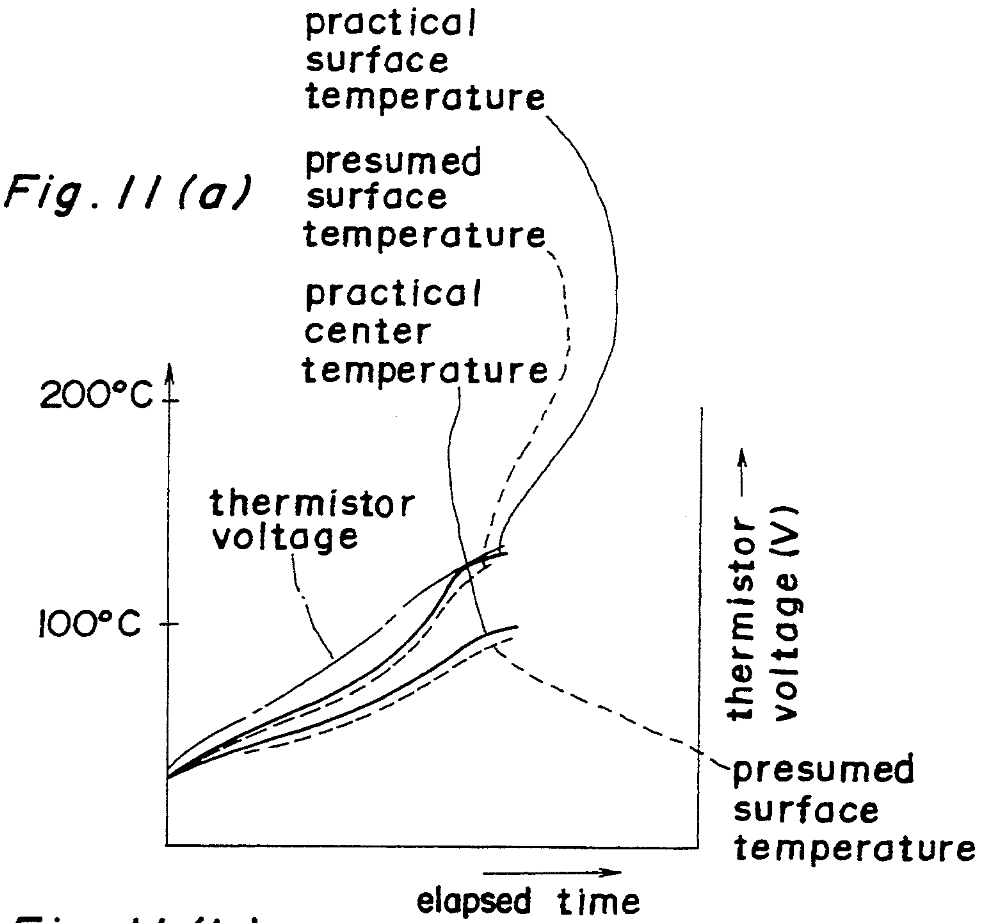
FIGS. 11(*a*) and 11(*b*) are graphs showing the characteristics of experimental data of the same cooking appliance and of the estimating temperature.
Figure 11:
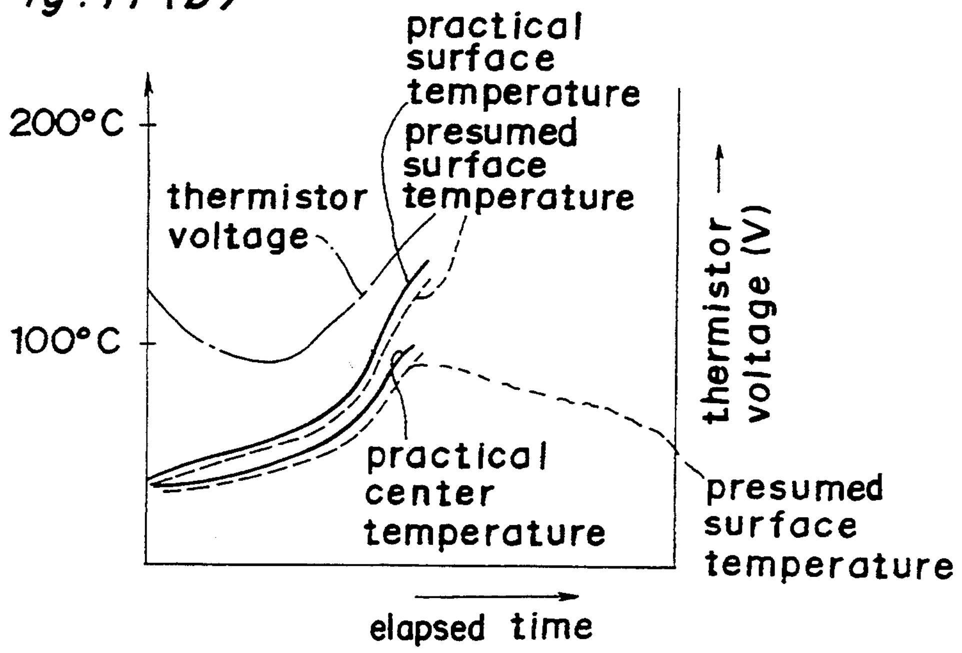

The commercial power supply voltage $V_T$ is inputted into the neural network model of the cooking degree estimating means 8 so as to effect the learning operation as in the first embodiment. As a result, the neural network model is confirmed to properly approximate the function F of the numerical equation 4. FIG. 11 shows the estimated temperature results. FIG. 11(*a*) shows a time when the temperature within the cooking chamber is low at the cooking start time. FIG. 11(*b*) shows a time when the temperature within the cooking chamber is high. It is found that the measured value conforms with the estimated temperature properly even if the cooking chamber indoor temperature at the cooking starting time is low or high.

According to the construction of the present embodiment, the estimated accuracy of the surface temperature and the center temperature of the cooked item can be improved as compared with the first embodiment even with respect to the variation in the commercial power supply voltage.

(EMBODIMENT 3)

The present embodiment is provided with a displaying means 13 for displaying the estimated temperature information of the cooking degree estimating means 8 used in the first embodiment and the second embodiment during the progressive cooking operation. FIG. 4 shows the cooking condition in detail. In the present embodiment, the displaying means 13 is composed of fluorescent display pipes and is provided with an operating means 9. In the present embodiment, the displaying means 13 is composed of a time displaying means 13(*b*) for displaying the estimated surface temperature information level. In the present embodiment, the finishing temperatures of the cooked item shown in FIG. 6 are displayed in five stage levels. When the estimated surface temperature reaches the level of the temperature, the controlling means 4 operates to display the temperature on the temperature display means 13(*b*).

According to the construction of the present embodiment, the cooking appliance becomes extremely convenient to users as the finished condition of the cooked item is seen visually in the change of the surface temperature.

(EMBODIMENT 4)

Figure 3:
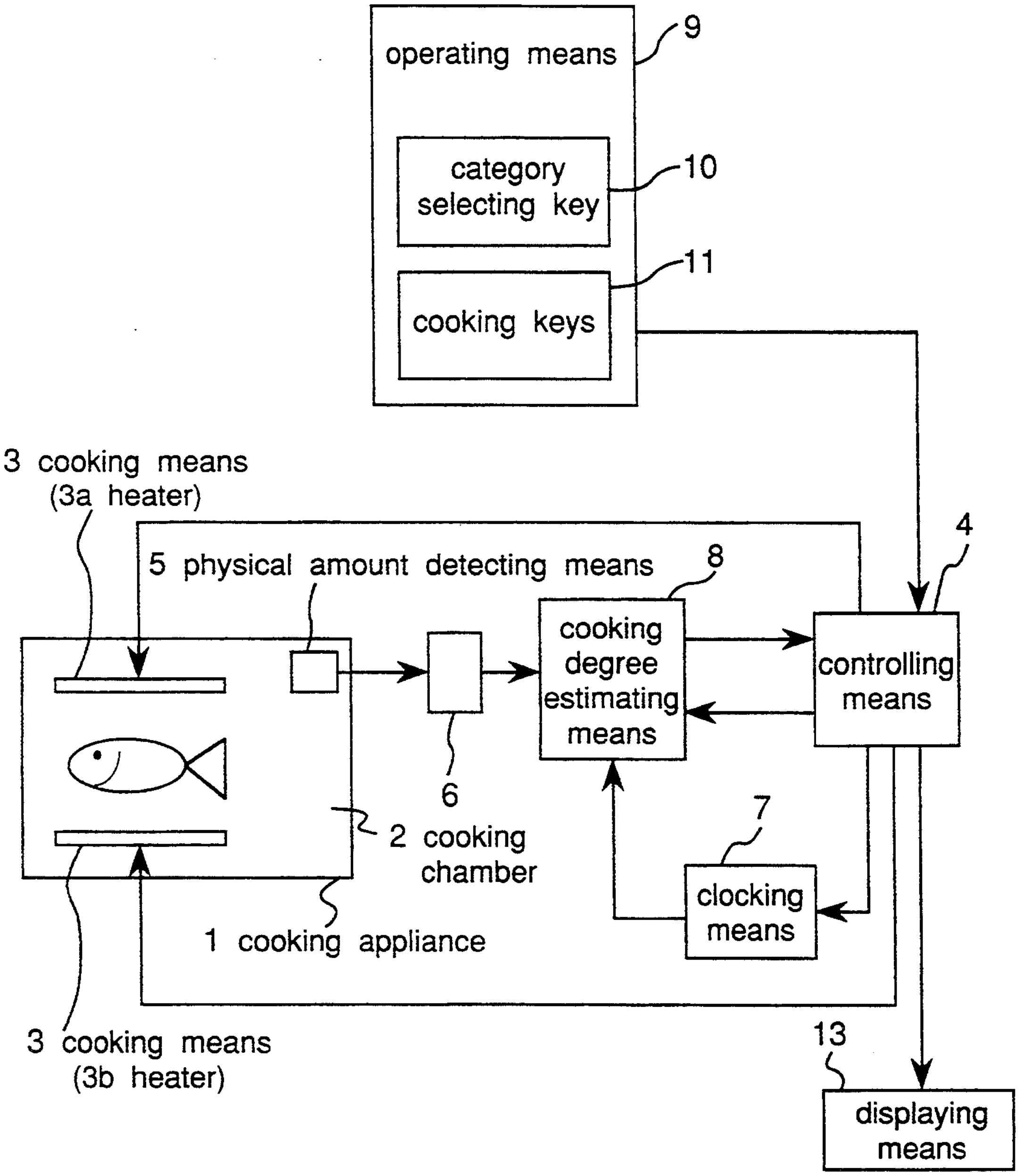

An object of the present embodiment, shown in FIG. 3, is to effect the energization switching control of a plurality of heaters of the cooking means 3 under the estimated surface temperature information and the estimated center temperature information of the cooking degree estimating means 8 so as to improve the performance of the cooking appliance.

Figure 12:
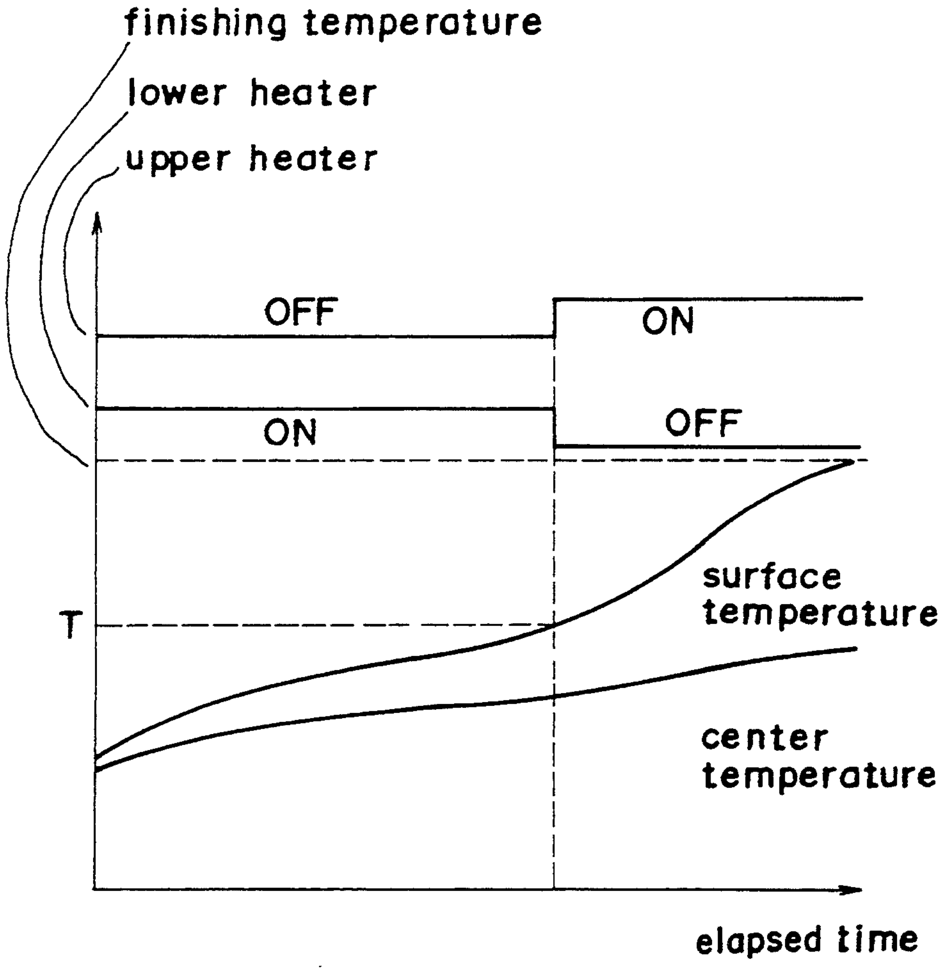
FIG. 12 is a graph for illustrating the switching timing of a cooking device of the cooking appliance in accordance with the block diagram of FIG. 3.
Figure 13A:
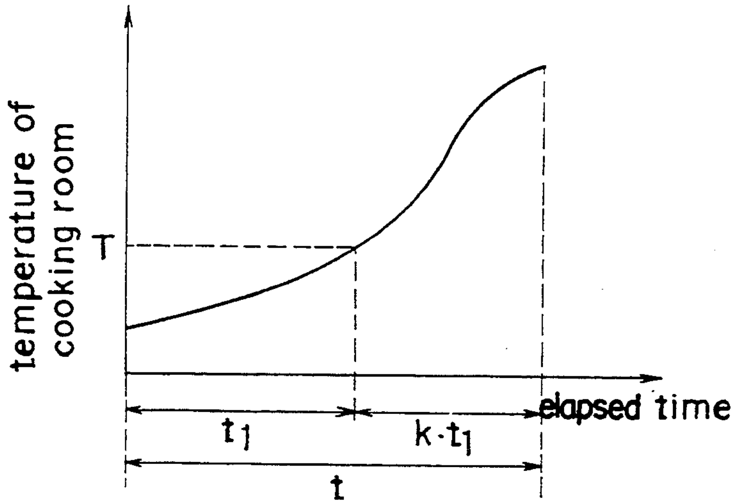
Fig. 13(a) PRIOR ART
FIGS. 13(*b*) and 13(*b*) are graphs as to how to decide the optimum cooking time in accordance with the conventional cooking appliance.
Figure 13B:
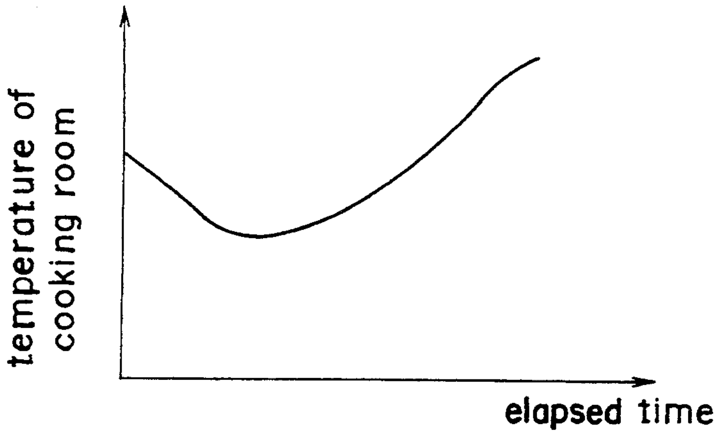
Fig. 13(b) PRIOR ART

The cooking means 3 is composed of a heater 3*a* for radiating heat from above the cooked item and a heater 3*b* for radiating heat from below. The energization of the heater 3*a* and the heater 3*b* is switched by a controlling means 4 under the estimated temperature information and the center temperature information so as to effect a control operation. FIG. 12 shows a timing chart of a heater switching operation. If the heater switching temperature (T) is reached through the energization of the lower heater 3*b* only at the cooking start time, the upper heater 3*a* only is energized so as to continue to flow the current to the surface temperature of the finishing operation. The heater switching temperature (T) of the first cooking category in, for example, FIG. 5 is assumed to be 65° C. In the present embodiment, the switching temperature (T) is changed by the cooking category so as to effect an optimum control.

According to the construction of the present embodiment as described hereinabove, the optimum energization switching control can be effected in accordance with the temperature information if the heater is plural in construction by the estimated temperature information, and the cooking performance of the cooking appliance can thus be improved.

In the above described embodiment, the controlling means 4, the clocking means 7, and the cooking degree estimating means 8 are all composed of 4-bit microcomputers. They can be composed, needless to say, of one microcomputer. Although information such as atmospheric temperature information of the physical amount detecting means 5, the temperature grade information, the elapsed time information from the cooking start time to be obtained from the clocking means 7, the category information of the cooked item to be obtained from the category selecting key 9*a*, the commercial power supply voltage information and so on is inputted into the temperature estimating means 8, these limitations do not restrict the present invention. The information may be processed to improve the estimated accuracy and may be inputted. The neural network model for constituting the cooking degree estimating means 8 is three layers of a perceptron, and the number of the neurons of the hidden layer is ten. This fact does not restrict the present invention. Although the present embodiment is divided into five categories as the cooking category, the number does not restrict the present invention. Any means will do, if it is a neural network model which can estimate the surface temperature and the center temperature from the above described input information. Although the atmospheric temperature information is used as the physical amount information to be caused during the cooking operation, smoke information, color information about scorching, humidity information and steam information can be applied. In addition, the physical information peculiar to the cooked item, shape information such as weight information, the volume of the cooked item, the height thereof and so on may be applied. The estimated accuracy can be further improved if a plurality of sensors are used in combination. In the present embodiment, they were applied to the grill portion of the oven range as a cooking appliance. They can be, needless to say, applied even to a gas oven or an electronic range.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A cooking appliance, comprising:

a cooking chamber for accommodating an object to be cooked;

a heater for heating the object to be cooked within said cooking chamber;

a physical characteristic detecting means for detecting a change in a physical characteristic in said cooking chamber while the object to be cooked is heated by said heater and providing an output signal representing the detected change in the physical characteristic;

a timer for counting the amount of time that elapses from said heater starting to heat the object to be cooked, said timer providing an output signal representing the amount of time;

a cooking degree estimating means for providing an estimate of the degree to which the object to be cooked has been cooked from said output signals from said physical characteristic detecting means and said timer and from a predetermined relationship between (a) changes in the physical characteristic in said cooking chamber while the object to be cooked is being cooked by said heater, (b) the amount of time that has elapsed from said heater starting to heat the object to be cooked and (c) changes of the temperature of the object to be cooked, and for outputting a signal representing the estimate of the degree to which the object has been cooked; and a control means for controlling said heater on the basis of said signal outputted from said cooking degree estimating means.

2. The cooking appliance of claim 1, wherein said signal outputted by said cooking degree estimating means represents an estimated surface temperature of the object to be cooked.

3. The cooking appliance of claim 2, and further comprising a display means connected to said control means for displaying changes in the temperature of the object to be cooked from said signal outputted by said cooking degree estimating means.

4. The cooking appliance of claim 2, wherein said cooking chamber has a second heater for heating the object to be cooked and said control means selectively controls said heaters for switching activation of said heaters in accordance with the estimated temperature of the object to be cooked.

5. The cooking appliance of claim 1, and further comprising a power supply voltage detecting means for detecting the voltage of commercial power supplied to said cooking chamber and providing an output signal representing the detected voltage, said cooking degree estimating means further providing the estimate of the degree to which the object has been cooked based on said output signal from said power supply voltage detecting means.

6. A cooking appliance, comprising:

a cooking chamber for accommodating an object to be cooked;

a heater for heating the object to be cooked within said cooking chamber;

a physical characteristic detecting means for detecting a change in a physical characteristic in said cooking chamber while the object to be cooked is heated by said heater and providing an output signal representing the detected change in the physical characteristic;

a timer for counting the amount of time that elapses from said heater starting to heat the object to be cooked, said timer providing an output signal representing the amount of time;

an operating means for providing selective input control signals, said operating means comprising a plurality of keys classified into separate cooking categories, each said cooking category corresponding to a degree of cooking indicating at least a desired finishing temperature of the object to be cooked;

a cooking degree estimating means for estimating the degree to which the object to be cooked has been cooked and for outputting a signal representing, an estimate of the degree to which the object has been cooked based on said output signals from said physical characteristic detecting means and said timer; and a control means for outputting a control signal to said heater when said signal outputted from said cooking degree estimating means indicates an estimate of the degree to which the object has been cooked corresponding to the degree of cooking of a said cooking category selected from said operating means.

7. The cooking appliance of claim 6, wherein said signal outputted by said cooking degree estimating means represents an estimated surface temperature of the object to be cooked.

8. The cooking appliance of claim 7, and further comprising a display means connected to said control means for displaying changes in the temperature of the object to be cooked from said signal outputted by said cooking degree estimating means.

9. The cooking appliance of claim 7, wherein said cooking chamber has a second heater for heating the object to be cooked and said control means selectively controls said heaters for switching activation of said heaters in accordance with the estimated temperature of the object to be cooked.

10. The cooking appliance of claim 6, and further comprising a power supply voltage detecting means for detecting the voltage of commercial power supplied to said cooking chamber and providing an output signal representing the detected voltage, said cooking degree estimating means further providing the estimate of the degree to which the object has been cooked based on said output signal from said power supply voltage detecting means.

* * * * *

UNITED STATES PATENT AND TRADEMARK OFFICE
CERTIFICATE OF CORRECTION

PATENT NO. : 5,389,764

DATED : February 14, 1995

INVENTOR(S) : Kazunari NISHII et al.

It is certified that error appears in the above-identified patent and that said Letters Patent is hereby corrected as shown below:

Title page, item [73] change "Matsuhista" to --Matsushita--.

Signed and Sealed this

Eighteenth Day of July, 1995

Attest:

BRUCE LEHMAN

*Attesting Officer* *Commissioner of Patents and Trademarks*